(No Model.)

C. T. REDFIELD.
ANTIRATTLING NUT LOCKING DEVICE FOR THILL COUPLINGS.

No. 606,085.            Patented June 21, 1898.

WITNESSES:

INVENTOR
C. T. Redfield
BY
ATTORNEYS.

UNITED STATES PATENT OFFICE.

CHARLES T. REDFIELD, OF GLENHAVEN, NEW YORK.

ANTIRATTLING NUT-LOCKING DEVICE FOR THILL-COUPLINGS.

SPECIFICATION forming part of Letters Patent No. 606,085, dated June 21, 1898.

Application filed December 28, 1897. Serial No. 663,974. (No model.)

*To all whom it may concern:*

Be it known that I, CHARLES T. REDFIELD, of Glenhaven, in the county of Cayuga and State of New York, have invented a new and Improved Antirattling and Nut-Locking Device for Thill-Couplings, of which the following is a full, clear, and exact description.

The object of the invention is to improve upon the construction shown in the patent granted to me June 1, 1897, No. 583,816, the improvement being such that a portion of the body of the device can have firm bearing against the barrel of the coupling without in the slightest degree interfering with the bearing of the device upon the nut of the coupling.

A further object of the invention is to so construct the entire device that it may be expeditiously and conveniently applied to the pivot-bolt of a thill-coupling, and whereby, further, when the nut of the bolt is screwed up it will force the device to a positive bearing on the barrel of the coupling and at the same time hold the nut on the bolt in the position to which it is adjusted, the bearing of the device on the barrel and its bearing on the nut being independent in action.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
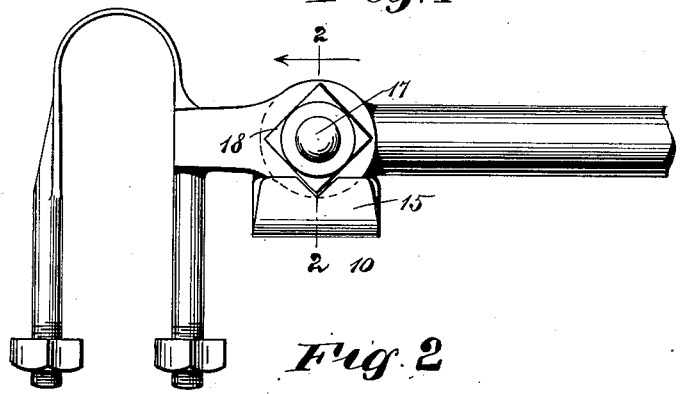
Figure 2:
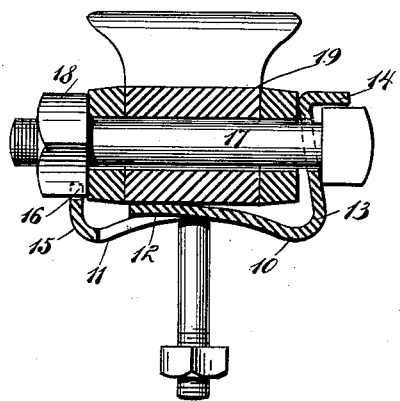
Figure 3:
Figure 5:
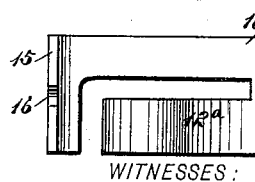
Figure 4:
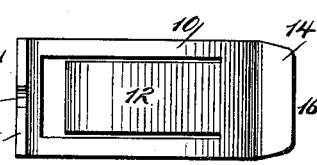
Figure 6:
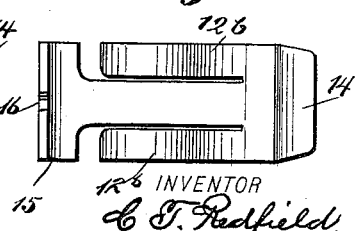

Figure 1 is a side elevation of a thill-coupling to which the invention is applied. Fig. 2 is a section on the line 2 2 of Fig. 1. Fig. 3 is a perspective view of the attachment removed from the coupling. Fig. 4 is a plan view of the attachment, and Figs. 5 and 6 are plan views of modifications.

The device, which is shown especially in Fig. 3, is preferably made from a single piece of material bent upon itself to form an arched body 10, in which a tongue 12 is formed, the free end of the tongue being normally above the plane of the upper face of the body.

In the ordinary construction of the device the upper surface of the body is convexed and the lower face concaved, and between the free end of the tongue and adjacent portion of the body an opening 11 is made, which is a continuation of the opening necessitated by the formation of the aforesaid tongue 12.

At one end of the body of the device an upwardly-extending wing or section 13 is formed which is provided, preferably, with an opening, and the top portion of said wing is bent outwardly, forming a flange 14. At the opposite end of the body a smaller wing 15 is formed, the said smaller wing 15 being provided with an indentation or a recess 16, which is usually given an angular shape or a V shape, so that it may receive a corner of a nut.

In the application of the device the pivot-bolt 17 of the coupling is passed through the opening in the larger wing 13 of the device, and the nut 18 upon the said pivot-bolt will engage with the upper surface of the shorter wing 15, while the tongue 12 will be brought in engagement with the barrel 19 of the coupling, as is shown particularly in Fig. 2.

The extent to which the tongue 12 is to engage with the barrel is controlled by the movement of the nut 18 on the bolt 17. As the nut is screwed up tightly the body of the device is contracted or drawn together in direction of its ends, so that the tongue 12 will be made to bear to a greater or less extent against the barrel, and this action takes place independently of the body proper or the ends of the device, particularly leaving the end portions of the device in normal position relative to the bolt 17 and the nut 18. As the nut is turned it will have bearing against the upper end of the shorter wing 15, and when a corner of the nut is brought in such position that it will enter the recess or depression 16 after the nut is adjusted the said depression will serve to hold the nut in its adjusted position; but the spring of the shorter wing 15 will at all times be such as to bear sufficiently against the nut to prevent it from turning.

In Fig. 5 I have illustrated a slight modification in the construction of the device, in which the tongue (designated as 12ª in said figure) is not centrally located, as shown in Fig. 3, but is formed at one side of the body, and in Fig. 6 I have shown another form of the device, in which a tongue (designated as 12ᵇ) is located at each side of the center, the central portion of the device being continued to form the end that engages with the nut.

I have slitted the spring-body (shown in the former patent referred to in the preamble) in the manner shown, so as to produce a double spring, each spring acting independently of the other, one to lock the nut of the coupler and the other to stop the rattling or take up lost motion.

Having thus described my invention, I claim as new and desire to secure by Letters Patent—

1. A bearing and locking plate for thill-couplings, consisting of a spring-body provided with a tongue-section between its ends and with wings at the ends, one adapted as a means of support and the other for locking engagement with the nut of the pivot-bolt of the thill-coupling, as described.

2. In a bearing and locking plate for thill-couplings, a body-section provided with a tongue and wings at its ends, the free end of the tongue extending beyond the plane of the upper surface of the body, one wing being longer than the other and provided with an opening and a flange, substantially as described.

3. The combination, with the barrel of a thill-coupling and the pivot-bolt and nut of the said barrel, of an attachment consisting of a plate provided with a body portion having a tongue arranged for engagement with the barrel, a wing at one end adapted to receive the bolt, and a wing at the opposite end, adapted for contact with the nut of the said pivot-bolt, for the purpose specified.

4. In an antirattling and nut-locking device for thill-couplings, a double spring, each spring extending parallel with and acting independently of the other, one spring locking the nut on the coupling-bolt and the other spring acting to prevent rattling of the coupling.

5. In an antirattling and nut-locking device for thill-couplings, a spring-body divided longitudinally to form a tongue adapted to engage with the barrel of the coupling and a section adapted to lock the nut on the bolt of the said coupling, as and for the purpose specified.

6. An antirattling nut-locking device having a body or connecting portion and end wings and having such body provided between its sides with a tongue whose free end is deflected for engagement with the barrel of the coupling substantially as described.

CHARLES T. REDFIELD.

Witnesses:
J. FRED. ACKER,
JNO. M. RITTER.